(12) United States Patent
Taylor

(10) Patent No.: US 6,889,547 B1
(45) Date of Patent: May 10, 2005

(54) LIQUID LEVEL INPUT ASSEMBLY FOR MEASURING THE HEIGHT OF A COLUMN OF LIQUID

(75) Inventor: Julian S. Taylor, Oklahoma City, OK (US)

(73) Assignee: Taylor Innovations, LLC, Oklahoma City, OK (US)

( * ) Notice: Subject to any disclaimer, the term of this patent is extended or adjusted under 35 U.S.C. 154(b) by 0 days.

(21) Appl. No.: 10/741,614

(22) Filed: Dec. 19, 2003

(51) Int. Cl.$^7$ ............................................. G01F 23/00
(52) U.S. Cl. ......................................... 73/291; 73/299
(58) Field of Search ..................... 73/299, 291, 715, 73/716, 701, 302; 200/83 R

(56) References Cited

U.S. PATENT DOCUMENTS

| | | | |
|---|---|---|---|
| 3,358,098 A | 12/1967 | Hill .......................... | 200/83 R |
| 3,412,609 A | 11/1968 | Kaletka et al. ............... | 73/308 |
| 3,956,934 A | 5/1976 | White .......................... | 73/323 |
| 4,373,388 A | 2/1983 | Kitamura et al. ............. | 73/301 |
| 4,454,760 A * | 6/1984 | Carlisle ....................... | 73/302 |
| 4,796,469 A | 1/1989 | Brown et al. ................. | 73/49.2 |
| 4,988,978 A | 1/1991 | Soto ........................... | 340/624 |
| 5,170,659 A * | 12/1992 | Kemp .......................... | 73/46 |
| 5,900,546 A | 5/1999 | Wilkins ..................... | 73/290 V |
| 6,260,414 B1 | 7/2001 | Brown et al. ................. | 73/295 |
| 6,435,026 B1 | 8/2002 | Donehue ..................... | 73/314 |

OTHER PUBLICATIONS

"685 Liquid Level Indicator for Atmospheric Vessels," Well-Mark Series 6851, pp. 1-2, Sec. 1.1, The WellMark Company, L.L.C., Oklahoma City, OK.
"685 Multiswitch Liquid Level Indicator for Atmospheric Vessels," WellMark Series 685M, pp. 5-6, Sec. 1.3 The WellMark Company, L.L.C., Oklahoma City, OK.
"685S Liquid Level Indicator For Atmospheric Vessels," pp. 68-69, Major Controls, Inc.

* cited by examiner

Primary Examiner—Hezron Williams
Assistant Examiner—Tamiko Bellamy
(74) Attorney, Agent, or Firm—Fellers, Snider, et al.

(57) ABSTRACT

An apparatus which indicates a level of a column of liquid in a storage vessel. A liquid level input assembly comprises flexible first and second sealing members which cooperate to form an enclosed chamber therebetween. The column of liquid applies a hydrostatic input force upon the first sealing member. The input force is translated through the first and second sealing members to a liquid measurement assembly to provide an indication of the height of the column. A leak indicating member is coupled to the enclosed chamber to indicate the presence of leaked liquid from the column through the first sealing member. Preferably, the first sealing member comprises a substantially planar diaphragm. The second sealing member also preferably comprises a substantially planar diaphragm, or alternatively preferably comprises a sealing ring. The liquid level input assembly can accommodate pressurized vessels and vessels that are vented to the surrounding atmosphere.

20 Claims, 5 Drawing Sheets

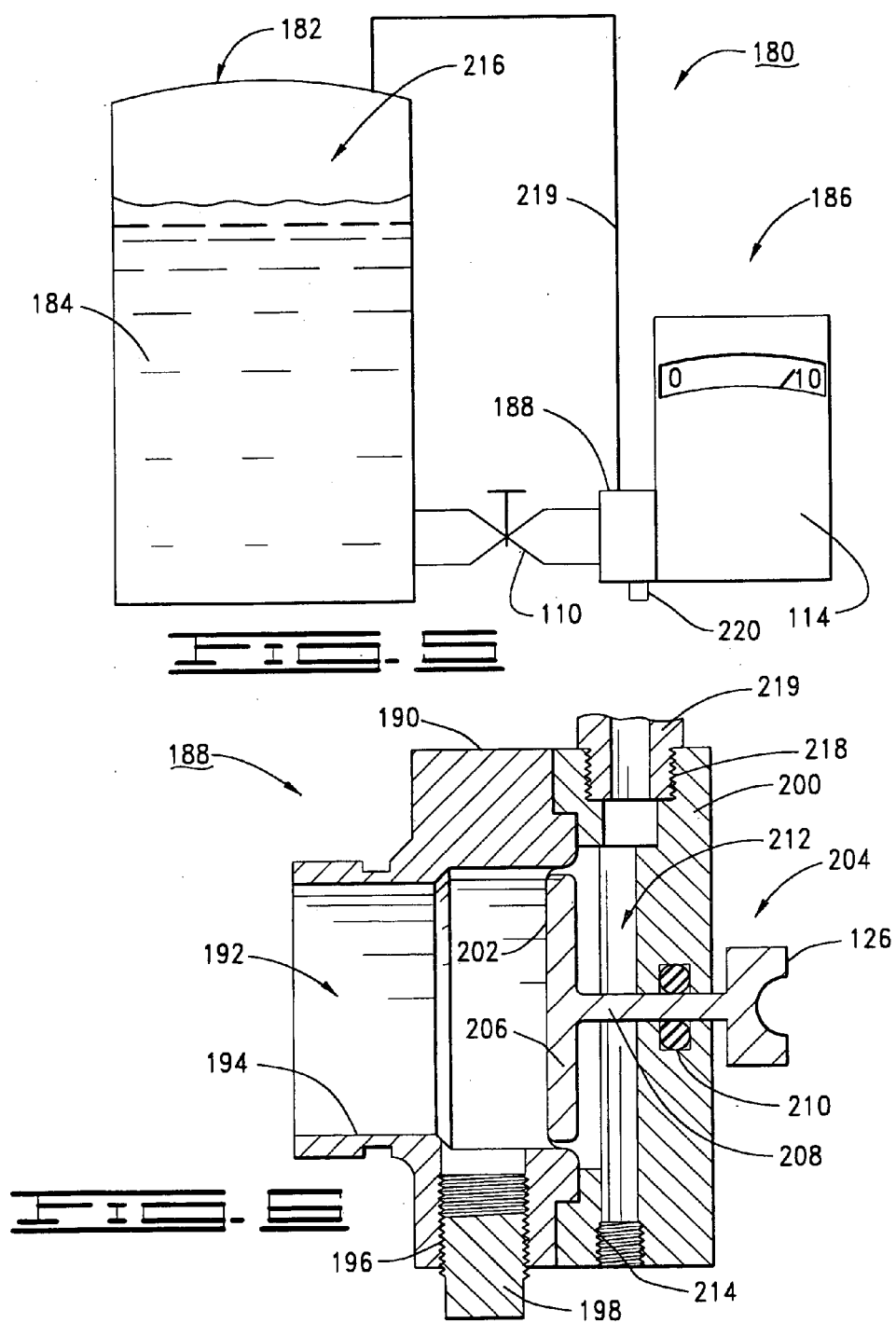

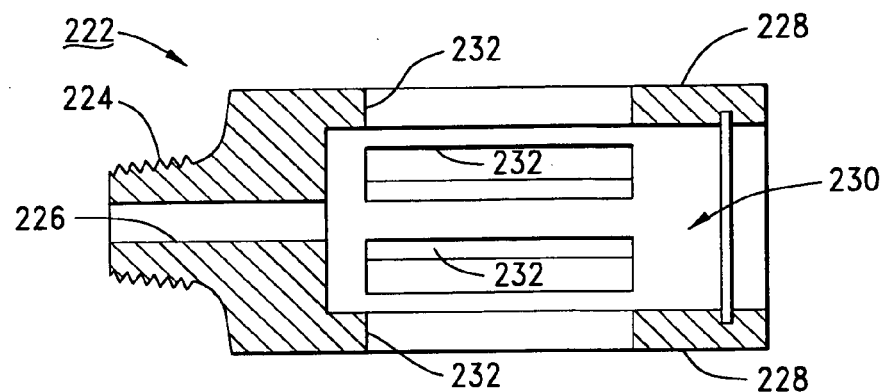
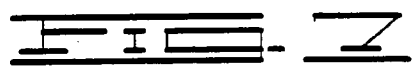
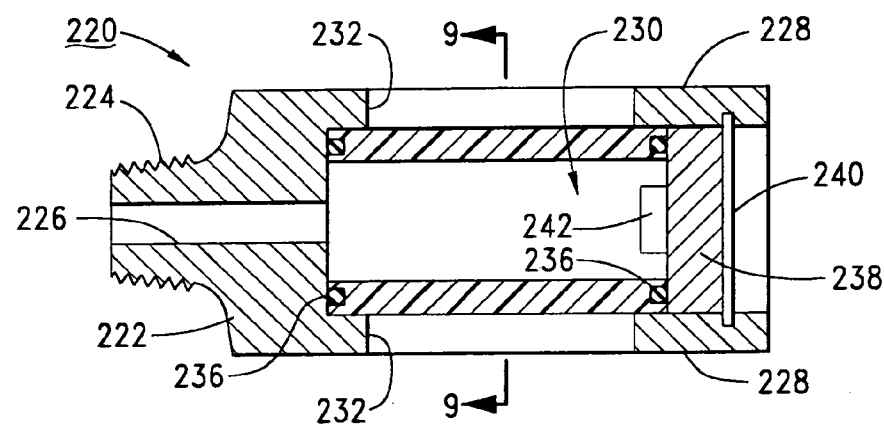
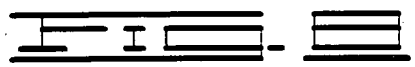
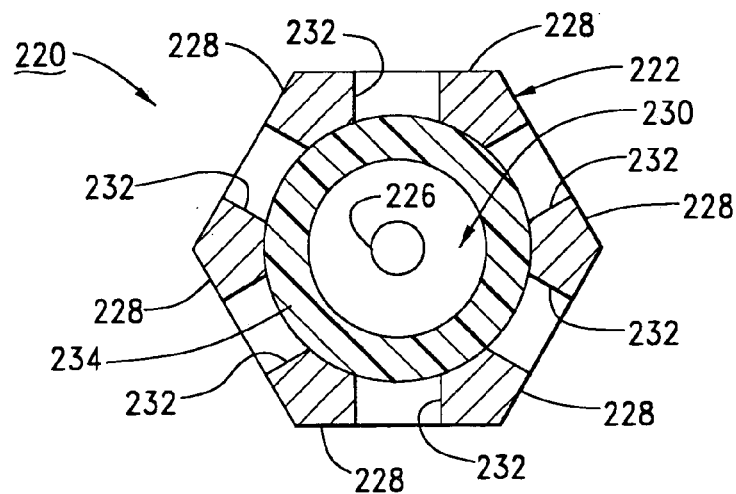
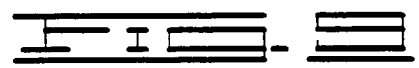

LIQUID LEVEL INPUT ASSEMBLY FOR MEASURING THE HEIGHT OF A COLUMN OF LIQUID

FIELD OF THE INVENTION

The claimed invention relates generally to liquid storage vessels and more particularly, but not by way of limitation, to a liquid level input assembly used to provide an indication of the amount of liquid present in a vessel.

BACKGROUND

It is common to collect liquids in storage vessels. Such liquids can include oil and other hydrocarbon based fluids, water (fresh or brine), hazardous chemicals, and the like. Vessels can be buried underground such as underground fuel storage tanks used in automotive service stations, or located above ground such as storage tanks used in association with drilling and refining operations in the oil and gas industry. Vessels can be pressurized or vented to the surrounding atmosphere depending upon the volatility and hazards (if any) associated with the collected liquid.

It is often advantageous to monitor the level of liquid present in a vessel. This prevents overfilling as well as indicates when the vessel is approaching an empty condition, allowing additional liquid to be added to the vessel to prevent an interruption in the ability to draw liquid therefrom.

A variety of liquid level indicators have been proposed in the art. An externally mounted liquid level indicator is disclosed in U.S. Pat. No. 3,358,098 issued to Hill. This reference mounts the indicator near the bottom of and through an outer wall of a storage tank to receive hydrostatic pressure from a column of liquid housed within the tank. This pressure is transmitted through a sealing diaphragm to a piston which, in turn, operates a pivotal pointer to provide a relative indication of the height of the column of liquid.

A submerged liquid level indicator is exemplified by U.S. Pat. No. 4,373,388 issued to Kitamura et al. This reference provides a housing with a transversely arranged diaphragm which divides the housing into opposing chambers. The housing is submerged at the bottom of the vessel so that a portion of the liquid enters the lower chamber, while the upper chamber is vented to the external atmosphere. A pressure transducer measures the resulting deflection of the diaphragm to indicate the level of liquid in the vessel.

While these and other prior art approaches may have been found operable, there nevertheless remains a need for continued improvements in the manner in which the level of liquid in a storage vessel can be measured, and it is to such improvements that the present invention is generally directed.

SUMMARY OF THE INVENTION

As embodied herein and as claimed below, the present invention is generally directed to an apparatus which indicates a level of a column of liquid in a storage vessel.

In accordance with preferred embodiments, a liquid level input assembly comprises flexible first and second sealing members which cooperate to form an enclosed chamber therebetween. The liquid level input assembly is configured to be coupled to a column of liquid so that the column applies an input force upon the first sealing member in relation to a height of said column.

The input force is translated through the first and second sealing members to a liquid measurement assembly to provide an indication of the height of the column. A leak indicating member is coupled to the enclosed chamber to indicate the presence of leaked liquid from the column through the first sealing member.

Preferably, the first sealing member comprises a substantially planar diaphragm which nominally establishes a fluid-tight seal between the column of liquid and the enclosed chamber. The second sealing member also preferably comprises a substantially planar diaphragm, or alternatively preferably comprises a sealing ring, such as an elastomeric o-ring, which nominally establishes a fluid-tight seal between the enclosed chamber and the liquid measurement assembly.

A plunger assembly preferably contactingly abuts the first sealing member opposite the column of liquid, extends across the enclosed chamber and through the second sealing member to engage the liquid measurement assembly.

In accordance with a preferred embodiment, the leak indicating member comprises a receptacle coupled to the enclosed chamber to collect liquid from the column that has leaked through the first sealing member, the receptacle comprising a translucent window through which a human observer can observe the collected liquid. A dye is preferably placed within the receptacle which mixes with the collected liquid to enhance the visibility of the collected liquid.

Alternatively, the leak indicating member preferably comprises an electronic sensor disposed in communication with the enclosed chamber which senses the presence of the leakage of liquid from said column through the first sealing member.

The liquid level input assembly can be used in conjunction with an above ground storage vessel or a below ground storage vessel, and with a pressurized vessel or one vented to the atmosphere. The liquid level input assembly can further be externally mounted to an exterior wall of a storage vessel or submerged within the vessel, as desired.

These and various other features and advantages which characterize the claimed invention will become apparent upon reading the following detailed description and upon reviewing the associated drawings.

BRIEF DESCRIPTION OF THE DRAWINGS

FIG. 5 shows an alternative liquid storage system, with the system of FIG. 5 comprising a pressurized system that is closed to the surrounding atmosphere.

FIG. 6 shows an elevational, cross-sectional view of a liquid level input assembly from FIG. 5 in accordance with a preferred embodiment.

FIG. 7 is an elevational, cross-sectional view of a housing of a leak indicating member preferably used in conjunction with the liquid level input assemblies of FIGS. 3 and 6.

FIG. 8 is an elevational, cross-sectional view of the leak indicating member including the housing of FIG. 7 as well as a translucent acrylic tube supported therein.

FIG. 9 provides an end view of the leak indicating member as viewed along line 9—9 in FIG. 8.

DETAILED DESCRIPTION

Figure 1:
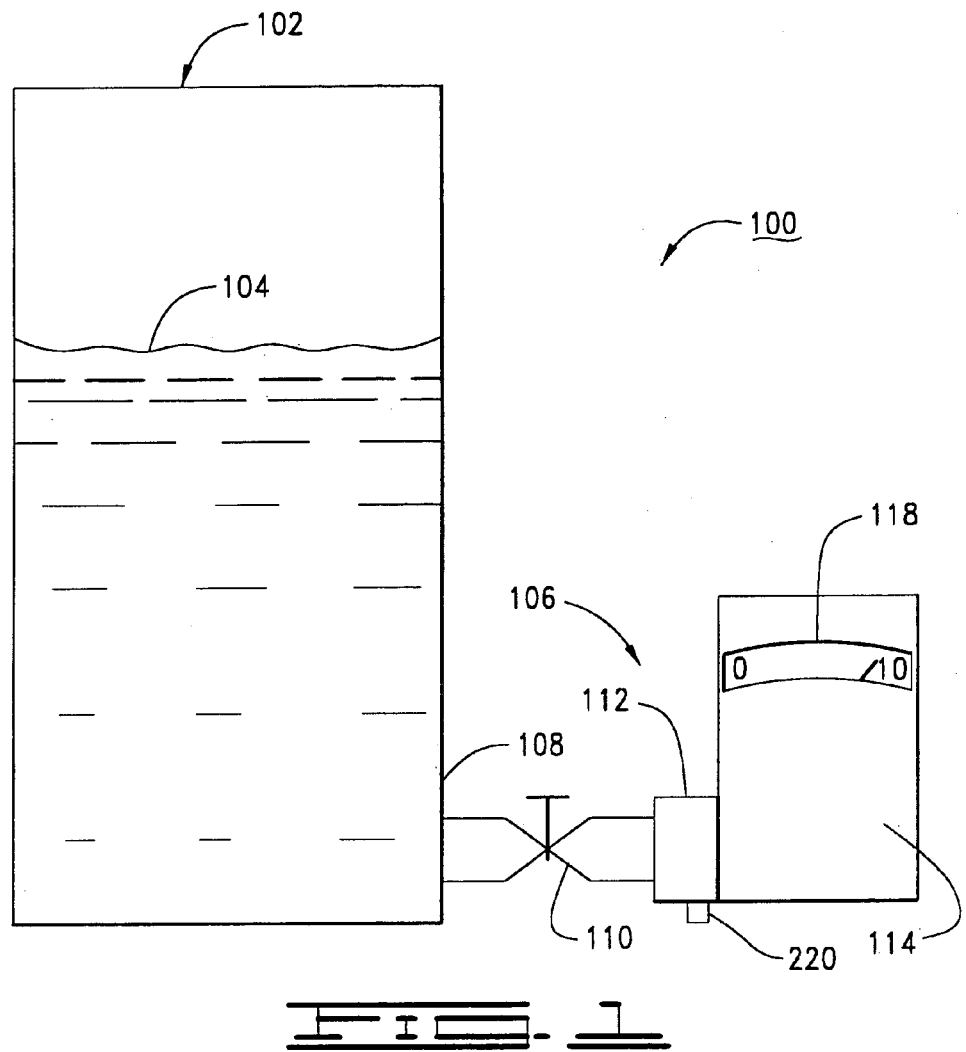
FIG. 1 is a schematic depiction of a liquid storage system constructed in accordance with preferred embodiments of the present invention, with the system of FIG. 1 being vented to the surrounding atmosphere.

FIG. 1 depicts a liquid storage system 100 constructed in accordance with preferred embodiments of the present invention. A vessel 102 (storage tank) stores a column of liquid 104.

For purposes of providing a concrete example, the liquid is contemplated as comprising brine water and the storage tank 102 is an above-ground tank that is vented to the atmosphere, although such characterizations of FIG. 1 are not limiting. It is further contemplated that the amount of liquid 104 within the storage tank 102 varies over time due to the introduction of additional liquid into the tank and the drawing of liquid from the tank, as required.

A liquid level indicator 106 provides an indication of the level of liquid within the storage tank 102. The liquid level indicator 106 is coupled to an outer wall 108 of the storage tank 102 near ground level to receive hydrostatic pressure from the column of liquid 104 via an opening (not shown) in the side wall 108.

The indicator 106 generally includes a valve 110, a liquid level input assembly 112 and a liquid level measurement assembly 114. The valve 110 is normally open to allow the liquid level to be continuously monitored, and is closed from time to time to facilitate servicing or maintenance operations upon the input and measurement assemblies 112, 114.

Figure 2:
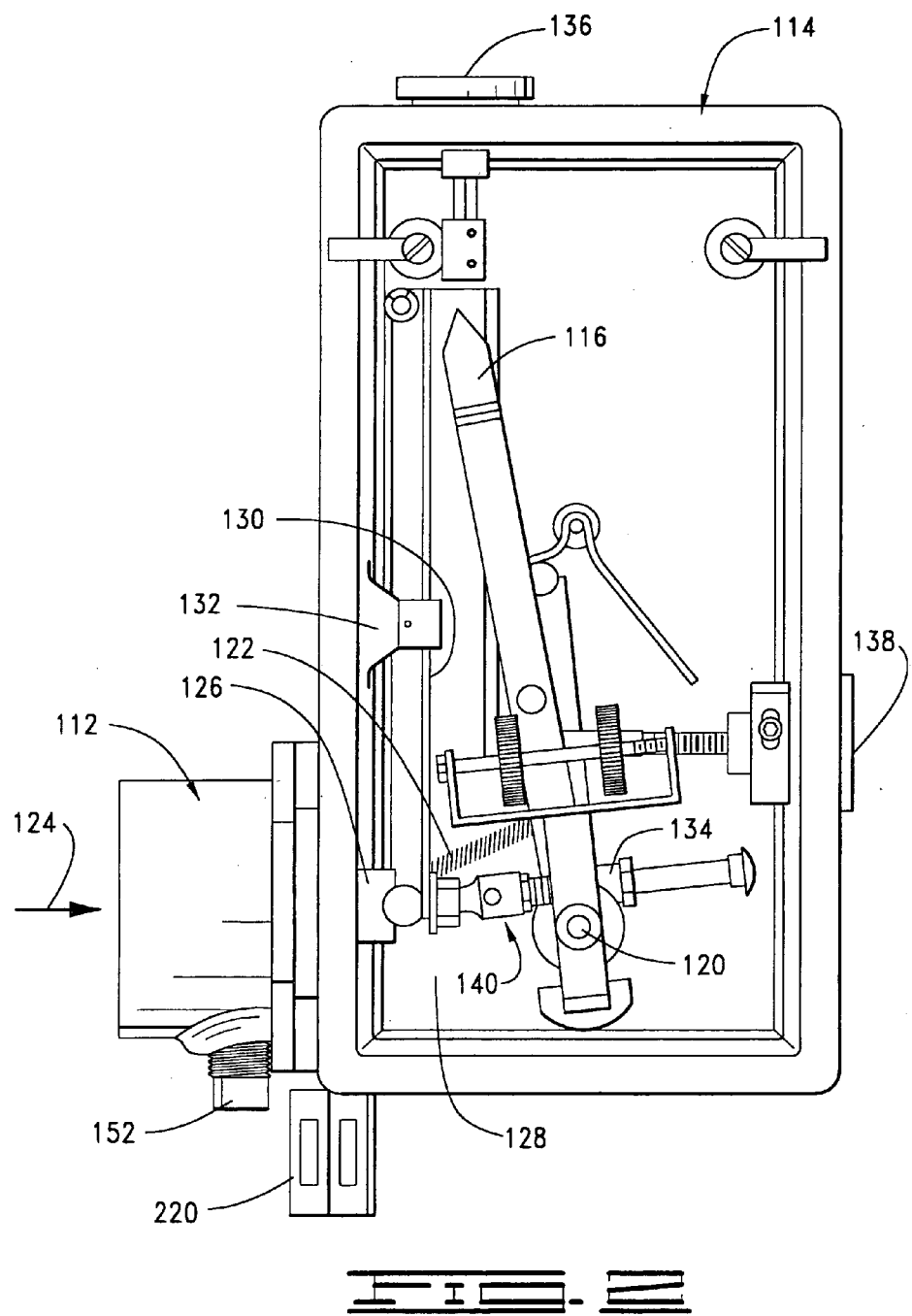
FIG. 2 provides an elevational view of a liquid level indicator from the system of FIG. 1.

FIG. 2 provides an elevational view of the input and measurement assemblies 112, 114 of FIG. 1 in accordance with a preferred embodiment. For reference, a front cover plate of the measurement assembly 114 has been removed in FIG. 2 to reveal selected components of interest.

The measurement assembly 114 has a construction that is generally similar to that disclosed in the aforementioned U.S. Pat. No. 3,358,098 Hill reference, except as noted below. Since any number of different measurement assemblies are known and can be utilized in addition to that represented in FIG. 2, a brief overview of the measurement assembly 114 will be sufficient for purposes of the present discussion.

Generally, the measurement assembly 114 provides a relative indication of the height of the column of liquid 104 using a pointer 116 which sweeps across a graduated dial (removed from FIG. 2 for clarity but depicted at 118 in FIG. 1). The dial preferably reads from zero (0) to ten (10), representative of a normalized range from 0% (empty) to 100% (full). The pointer 116 pivots about a pivot shaft 120. A zeroing spring 122 nominally biases the pointer 116 to the 0% (empty) position.

While preferred internal configurations of the liquid level input assembly 112 will be discussed below, at this point it will be noted that the column of liquid 104 from the storage tank 102 provides an input force (denoted by vector 124) that translates into lateral movement of a yoke 126 toward the measurement assembly 114. The yoke 126 supports a roller 128 that bears against a vertically aligned leaf spring 130 (bar spring), which opposes said lateral movement.

The strength of the leaf spring 130 generally establishes the overall range of the normalized readout provided by the pointer 116 and dial 118. An adjustable fulcrum for the leaf spring 130 is shown at 132. As the distal end of the leaf spring 130 deflects, a linkage 134 advances the pointer 116 to the right, thereby sweeping the pointer past the dial 118 (FIG. 1). Adjustment mechanisms 136 and 138 set the zero and maximum ranges of movement for the pointer 116.

One improvement incorporated into the measurement assembly 114 over that shown in the Hill reference is a universal joint 140 (ball and socket) between the linkage 132 and the distal end of the leaf spring 130. This translates the lateral movement of the yoke 126 to the elliptical movement of the linkage 132 as it drives the pointer 116 about the pivot shaft 120, thereby providing the pointer 116 with more uniform and accurate movement with respect to the graduations on the dial 118.

Figure 3:
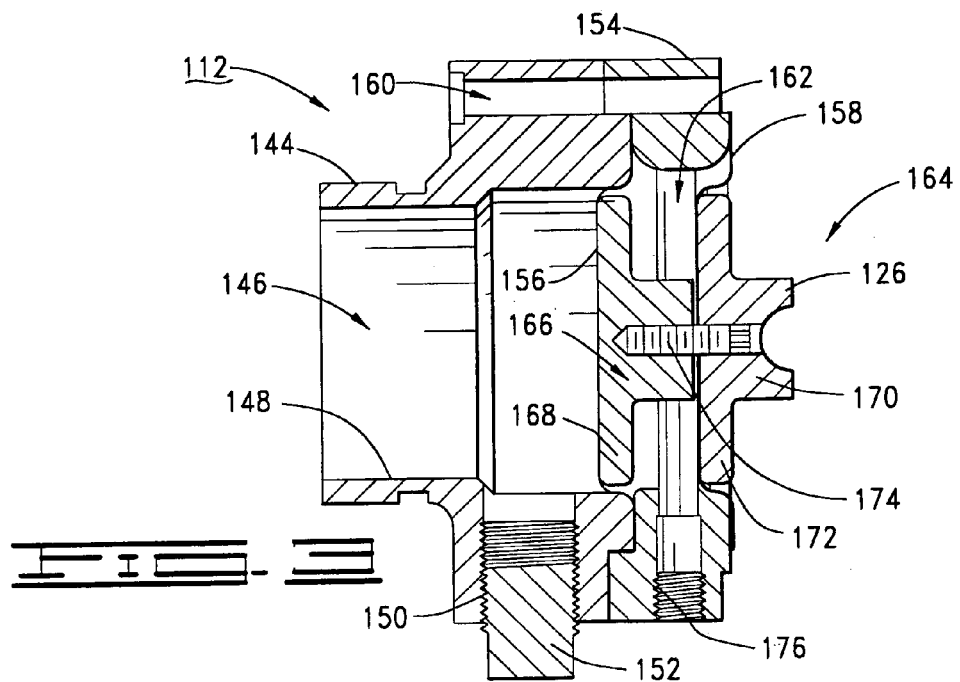
FIG. 3 is an elevational, cross-sectional view of a liquid level input assembly from FIG. 2 in accordance with a preferred embodiment.

FIG. 3 illustrates the liquid level input assembly 112 of FIG. 2 in accordance with a first preferred embodiment. The input assembly 112 includes a housing 144 with central orifice 146 and threaded inlet port 148. A port 150 communicates with the orifice 146 and is engaged by a threaded drain plug 152. The drain plug 152 is removed after the shut off valve 110 (FIG. 1) is closed to drain fluid downstream from the valve during servicing or maintenance operations. Draining the downstream fluid also allows a zero level reference to be established during field calibration.

An end cap 154 mates with the housing 144 to capture the circumferential edge of a flexible first sealing member 156. The first sealing member 156 is preferably characterized as a diaphragm comprising a substantially planar layer of rubber or similar suitable material which spans the orifice 146. However, other configurations for the first sealing member can readily be employed as desired including a sealing ring, a flexible disk, etc.

The input assembly 112 further employs a flexible second sealing member 158 which also spans the orifice 146. The second sealing member 158 is likewise preferably characterized as a diaphragm and is nominally identical to the diaphragm 156, although the second sealing member can also take different configurations as desired.

The second sealing member 158 is secured along its circumferential edge by compression of the input assembly 112 against the measurement assembly 114 via a plurality of fasteners (not shown) which are inserted into a corresponding number of suitably sized, commonly aligned apertures through the housing 144 and end cap 154 (one such aperture is denoted at 160). The second sealing member 158 is separated from the first sealing member 156 by a selected lateral distance to form an enclosed chamber 162 therebetween.

Figure 4:
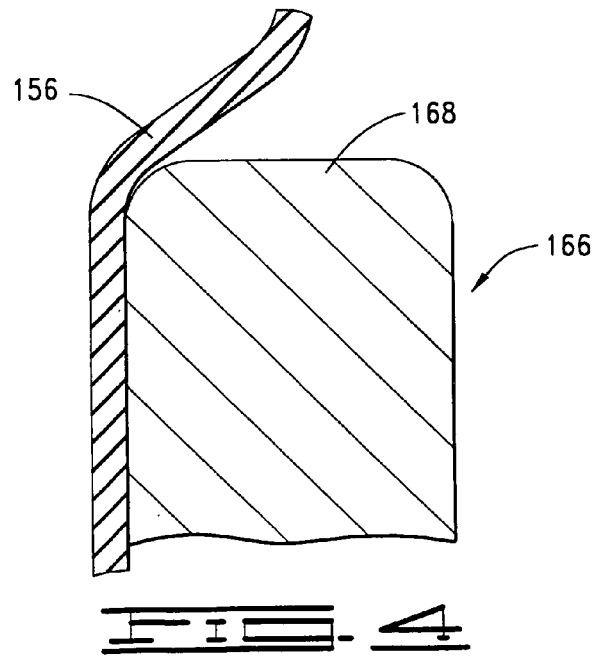
FIG. 4 shows relevant portions of FIG. 3 in greater detail.

A plunger assembly is generally denoted at 164. The plunger assembly 164 comprises a first plunger 166 having a disc-shaped piston member 168 which contactingly abuts the first sealing member 156 on a side opposite the inlet port 148. The plunger assembly 164 further comprises a second plunger 170 which similarly includes a disc-shaped piston member 172 that contactingly abuts the second sealing member 158 on a side opposite the inlet port 148. Portions of the first sealing member 156 and the piston member 168 are shown in greater detail in FIG. 4.

The first and second plungers 166, 170 are rigidly coupled together using an internal threaded fastener 174 (set screw), which passes through a central aperture (not designated) in the second sealing member 158. It will be noted that the first plunger is disposed within the enclosed chamber 162, and the second plunger 170 terminates in the aforedescribed yoke 126 of FIG. 2. FIG. 3 further shows the end cap 154 to incorporate a threaded port 176 which communicates with the enclosed chamber 162. The port 176 accommodates the use of a leak indicating member as discussed below.

At this point it will now be observed that, with reference to FIGS. 1–3, the hydrostatic pressure of the column of liquid 104 from the storage vessel 102 will impinge upon the first sealing member 156 to provide an input force (vector 124) that results in lateral movement of the plunger assembly 164 in relation to the height of the column of liquid. This lateral movement translates into the pivotal movement of the pointer 116 as hereinabove described to provide an indication of the level of liquid 104 in the tank 102.

FIG. 5 provides another liquid storage system 180 generally similar to the system 100 of FIG. 1. The system 180 utilizes an above-ground, pressurized storage vessel 182 (storage tank) that is closed to the surrounding atmosphere to store a column of fluid 184. For reference, the liquid 184 is contemplated as comprising a hydrocarbon based fluid although such is not limiting.

A liquid level indicator 186 operates to provide an indication of the level of liquid within the vessel 182. The liquid level indicator 186 includes the shut off valve 110 and measurement assembly 114 of FIG. 1, as well as a liquid level input assembly 188 the details of which are shown in FIG. 6.

The input assembly 188 comprises a housing 190 with a central orifice 192, an inlet port 194, a drain port 196 and a drain plug 198. An end cap 200 engages the housing 190 and compressively secures a circumferential edge of a flexible first sealing member 202. The sealing member 202 in FIG. 6 is preferably identical to the diaphragm sealing member 156 in FIG. 3.

A plunger assembly 204 includes a piston member 206 which contactingly abuts the first sealing member 202 opposite the inlet port 194. An elongated shaft 208 extends from the piston member 206, through the end cap 200 and terminates with the aforementioned yoke 126. The shaft 208 further extends through a flexible second sealing member 210, preferably characterized as a sealing ring. The sealing ring 210 is shown to have a conventional elastomeric o-ring construction, but other configurations including a rectangular cross-sectional shape can be readily employed. As with the embodiment of FIG. 3, the input assembly 188 in FIG. 6 has the first and second sealing members 202, 210 separated by a selected distance to define an enclosed chamber 212 therebetween. A sensor port 214 communicates with the chamber 212 as before.

With reference again to FIG. 5, it will be noted that because the storage tank 182 is closed to the surrounding atmosphere, a vapor space 216 will form in the tank above the liquid 184. This vapor space 216 will nominally achieve an equilibrium pressure in relation to a number of factors including the type and volume of liquid 184, the ambient temperature, etc.

The hydrostatic pressure upon the first sealing member 202 in FIG. 6 will generally arise from a combination of the weight of the column of liquid 184 and the pressure of the vapor space 216. The pressure component provided by the weight of the column will typically be substantially greater than the pressure component provided by the vapor space 216, but the vapor space pressure can nevertheless introduce significant error in the determined liquid level.

To compensate for the vapor space pressure, the input assembly 188 in FIG. 6 is further provided with a second port 218 in communication with the enclosed chamber 212. The second port 218 allows a conduit 220 to connect the enclosed chamber 212 with the vapor space 216.

In this way, the enclosed chamber 212 is nominally maintained at the same pressure as the vapor space 216. The net input force upon the first sealing member and the plunger assembly 204 is thus nominally provided in relation to the height of the column of liquid 184, allowing an accurate determination of said height in relation to the lateral movement of the yoke 126.

While effectively compensating for widely varying vapor space pressures, those skilled in the art upon a review of FIG. 6 will recognize that a small amount of error will nevertheless tend to remain in the measurement determination as a result of the vapor space pressure. This is because the plunger assembly 204 is not completely balanced; the attachment of the shaft 208 to the piston member 206 results in the surface area of the piston member 206 on the side facing the enclosed chamber 212 being slightly less than the surface area of the piston member 206 on the side facing the first sealing member 202.

This means that the force upon the piston member 206 in a direction toward the inlet 194 as a result the pressure of the vapor space 216 will be almost, but not quite, equal to the input force component upon the piston member 206 in the opposite direction caused by the vapor space pressure. Nevertheless, this error can be maintained at an acceptably low level provided the cross-sectional area of the shaft 208 is configured to be substantially smaller than the cross-sectional area of the piston member 206.

Reference is now made to FIGS. 7–9 which provide various details with respect to the aforementioned leak indicating member, herein denoted numerically at 220. The leak indicating member 220 preferably includes a housing 222 as shown in FIG. 7. The housing 222 is substantially "bottle" shaped and includes a threaded end 224 with inlet orifice 226 to engage the ports 174, 214 in FIGS. 3 and 6, respectively. For reference, FIG. 2 shows an elevational view of the leak indicating member 220 upon installation into the input assembly 112.

The housing 222 is preferably hexagonal in cross sectional shape so as to have a number of angularly arrayed face surfaces 228 (best viewed in FIG. 9) which surround a central orifice 230 of the housing. The central orifice 230 lies in communication with the inlet orifice 226.

Rectangular apertures 232 are formed through each of the respective face surfaces 228. This allows ready visual access to a transparent tube 234 inserted into the central orifice 230 as shown in FIG. 8. The tube 234 preferably comprises an acrylic tube with embedded, circumferentially extending sealing ring seals 236 at each end. An end cap 238 and snap retaining ring 240 retain the tube 234 in place.

The housing 222, tube 234 and end cap 238 cooperate to form a liquid tight receptacle configured to collect any liquid that enters the enclosed chambers 162, 212 of FIGS. 3, 6. In this way, a leak through the first sealing members 156, 202 caused by a puncture, tear, defect, fatigue, etc. can be readily identified by observing the presence of liquid through the transparent windows formed by the apertures 232 and tube 234.

A suitable colored dye (such as represented by pellet 242) can further be placed within the receptacle. In this way, a substantially clear liquid can be provided with a more easily discernable color (e.g., red, blue) to indicate the presence of a leak.

At the same time, such leak will generally not impact the ability of the measurement assembly 114 to continue to operate to detect the level of the liquid within the storage tank 102, 182. This is because the second sealing member (158 in FIG. 3 and 210 in FIG. 6) will nominally operate to prevent passage of the liquid 104, 184 into the housing of the measurement assembly 114 or otherwise out into the surrounding environment. Thus, failed sealing members can be readily identified and maintenance operations can be scheduled to replace such before a catastrophic leak occurs.

Figure 10:
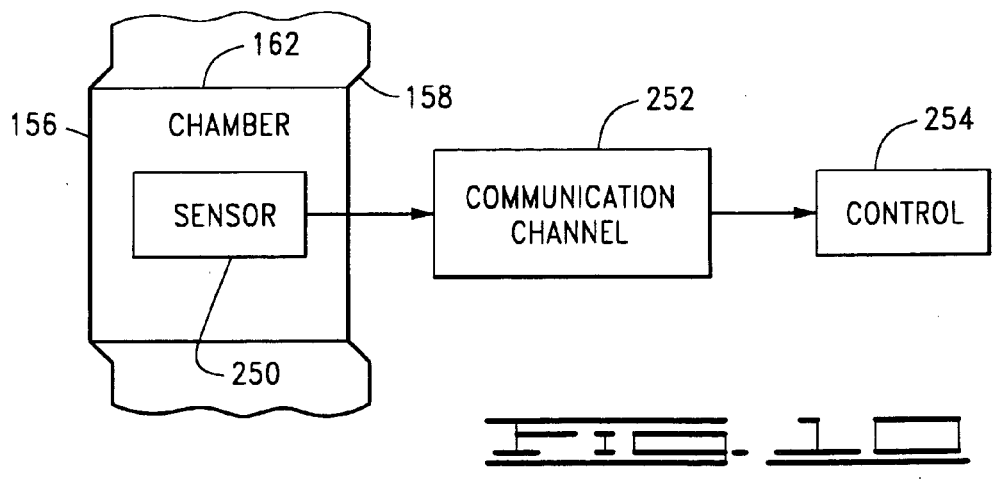
FIG. 10 is a functional block diagram of another embodiment of the leak indicating member which incorporates the use of an electronic sensor.

The leak indicating member 220 of FIGS. 7–9 generally relies upon visual inspection by a human observer to detect the presence of a leak through the first sealing member. FIG. 10 provides an alternative embodiment for a leak indicating member comprising an electrical sensor 250. The sensor 250 is contemplated as being disposed within the enclosed chamber 162 of FIG. 3 (i.e., between the first and second sealing members 156, 158).

The sensor 250 can take any number of forms, such as a low voltage continuity device with a pair of spaced apart terminals which outputs a signal as a result of a change in impedance (resistance, capacitance, etc) caused by the presence of leaked fluid between the terminals. The sensor 250 communicates over a communication channel 252 (which can be a hardwired cable connection, a wireless transmission network, etc.) to a control unit 254 at a remote location.

The control unit 254 can comprise a personal computer (PC) or similar equipment with suitable programming to alert a user of the presence of the detected fluid. As desired, the same communication channel can further be used to communicate liquid level measurements from the measurement assembly 114 as well as any other relevant data to the user.

It will now be recognized that the present invention (as embodied herein and as claimed below) provides certain notable advantages over the prior art. The use of first and second sealing members (such as 156, 158 in FIG. 3 and 202, 210 in FIG. 6) advantageously prevents catastrophic failures due to leaks that may arise from time to time through such sealing members.

At the same time, the use of the leak indicating member (such as 220, 250) allows the ready identification of the failure of the first sealing member, enabling maintenance personnel to schedule appropriate servicing operations at times when the liquid level indicator can be conveniently taken off line.

The present invention can also accommodate a wide variety of different types of storage systems, including above ground and underground tanks as well as both pressurized and vented tanks. The input assembly can be externally mounted to the outside wall of a storage vessel as exemplified herein, and can also be readily adapted for use in a submerged system (i.e., within the tank at the bottom of the fluid). Indeed, the high reliability and accuracy afforded by the embodiments disclosed herein readily facilitate use in any number of different environments and systems, depending upon the requirements of a given application.

In summary, the present invention is generally directed to an apparatus comprising a liquid level input assembly (such as 112, 188) comprising flexible first and second sealing members (such as 156, 158 and 202, 210) cooperating to form an enclosed chamber therebetween (such as 162, 212), wherein the liquid level input assembly is configured to be coupled to a column of liquid (such as 104, 184) so that said column applies an input force upon the first sealing member in relation to a height of said column, the input force translated through the first and second sealing members to a liquid measurement assembly (such as 114) to provide an indication of said height of said column, and wherein the liquid level input assembly further comprises a leak indicating member (such as 220, 250) coupled to the enclosed chamber which indicates presence of leakage of liquid from said column through the first sealing member.

For purposes of the appended claims, the recited means for indicating presence of leaked liquid through the first sealing member and into the enclosed chamber will be understood to correspond to the disclosed leak indicating member 220 of FIGS. 2, 7–9 and the sensor 250 of FIG. 10. The aforementioned prior art Hill 3,358,098 and Kitamura 4,373,388 references do not carry out the recited function and are explicitly excluded from the definition of an equivalent.

The term "column" will be defined as a vertical arrangement of liquid without regard to cross-sectional shape thereof. Hence, this term will not be limited to liquid arranged in a cylindrical shape as exemplified herein, but instead can take any number of different shapes including shapes defined by curved and spherical side walled vessels.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. An apparatus comprising a liquid level input assembly comprising flexible first and second sealing members cooperating to form an enclosed chamber therebetween, wherein the liquid level input assembly is configured to be coupled to a column of liquid so that said column applies an input force upon the first sealing member in relation to a height of said column, the input force translated through the first and second sealing members to a liquid measurement assembly to provide an indication of said height of said column, and wherein the liquid level input assembly further comprises a leak indicating member coupled to the enclosed chamber which indicates presence of leakage of liquid from said column through the first sealing member.

2. The apparatus of claim 1, wherein the first sealing member comprises a substantially planar diaphragm which nominally establishes a fluid-tight seal between the column of liquid and the enclosed chamber.

3. The apparatus of claim 2, wherein the second sealing member comprises a substantially planar diaphragm which nominally establishes a fluid-tight seal between the enclosed chamber and the liquid measurement assembly.

4. The apparatus of claim 2, wherein the second sealing member comprises a sealing ring which nominally establishes a fluid-tight seal between the enclosed chamber and the liquid measurement assembly.

5. The apparatus of claim 1, wherein the liquid level input assembly further comprises a plunger assembly which contactingly abuts the first sealing member opposite said column, extends across the enclosed chamber and through the second sealing member to engage the liquid measurement assembly.

6. The apparatus of claim 1, wherein the leak indicating member comprises a receptacle coupled to the enclosed chamber to collect liquid from said column that has leaked through the first sealing member, the receptacle comprising a translucent window through which a human observer can observe said collected liquid.

7. The apparatus of claim 6, wherein the leak indicating member further comprises a dye which mixes with said collected liquid to enhance visibility of said collected liquid.

8. The apparatus of claim 1, wherein the leak indicating member comprises an electronic sensor disposed within the enclosed chamber which senses the presence of the leakage of liquid from said column through the first sealing member.

9. The apparatus of claim 1, wherein said column is housed within a vessel that is vented to the atmosphere, wherein the first and second sealing members respectively comprise substantially planar first and second diaphragms, and wherein the liquid level input assembly further comprises a plunger assembly comprising a first plunger which contactingly abuts the first diaphragm and a second plunger which contactingly abuts the second diaphragm.

10. The apparatus of claim 1, wherein said column is housed within a pressurized vessel that is closed to the atmosphere, wherein the first sealing member comprises a substantially planar diaphragm, wherein the second sealing member comprises a sealing ring, wherein the liquid level input assembly further comprises a plunger assembly comprising a piston member which contactingly abuts the first diaphragm and a shaft which extends from the piston member, across the enclosed chamber and through the sealing ring to the liquid measurement assembly, and wherein the liquid level input assembly further comprises a conduit which connects the enclosed chamber to a vapor space within the pressurized vessel above said column.

11. An apparatus comprising:
a storage vessel configured to store a column of liquid;
a liquid level input assembly comprising flexible first and second sealing members cooperating to form an enclosed chamber therebetween and a plunger assembly coupled to said sealing members, the column of liquid applying an input force upon the first sealing member in relation to a height of said column, the input force translated through the second sealing member by the plunger assembly;
a liquid measurement assembly coupled to the plunger assembly to provide an indication of said height of said column; and
means for indicating presence of leaked liquid through the first sealing member and into the enclosed chamber.

12. The apparatus of claim 11, wherein the first sealing member comprises a substantially planar diaphragm which nominally establishes a fluid-tight seal between the column of liquid and the enclosed chamber.

13. The apparatus of claim 12, wherein the second sealing member comprises a substantially planar diaphragm which nominally establishes a fluid-tight seal between the enclosed chamber and the liquid measurement assembly.

14. The apparatus of claim 12, wherein the second sealing member comprises a sealing ring which nominally establishes a fluid-tight seal between the enclosed chamber and the liquid measurement assembly.

15. The apparatus of claim 11, wherein the indicating means comprises a receptacle coupled to the enclosed chamber to collect liquid from said column that has leaked through the first sealing member, the receptacle comprising a translucent window through which a human observer can observe said collected liquid.

16. The apparatus of claim 15, wherein the indicating means further comprises a dye which mixes with said collected liquid to enhance visibility of said collected liquid.

17. The apparatus of claim 11, wherein the indicating means comprises an electronic sensor disposed within the enclosed chamber which senses the presence of the leakage of liquid from said column through the first sealing member.

18. The apparatus of claim 11, wherein the storage vessel is vented to the atmosphere, wherein the first and second sealing members respectively comprise substantially planar first and second diaphragms, and wherein the plunger assembly comprises a first plunger which contactingly abuts the first diaphragm and a second plunger which contactingly abuts the second diaphragm.

19. The apparatus of claim 11, wherein the storage vessel is characterized as a pressurized vessel that is closed to the atmosphere, wherein the first sealing member comprises a substantially planar diaphragm, wherein the second sealing member comprises a sealing ring, and wherein the plunger assembly comprises a piston member which contactingly abuts the first diaphragm and a shaft which extends from the piston member, across the enclosed chamber and through the sealing ring to the liquid measurement assembly, and wherein the liquid level input assembly further comprises a conduit which connects the enclosed chamber to a vapor space within the pressurized vessel above said column.

20. The apparatus of claim 11, further comprising a ball and socket joint between the plunger assembly and a pointer of the liquid measurement assembly used to indicate the height of the column of liquid, the ball and socket joint translating lateral movement of the plunger assembly to elliptical movement of the pointer.

* * * * *